(12) United States Patent
Zhu et al.

(10) Patent No.: US 12,547,351 B2
(45) Date of Patent: Feb. 10, 2026

(54) METADATA MANAGEMENT METHOD AND APPARATUS, COMPUTER DEVICE, AND STORAGE MEDIUM

(71) Applicant: Suzhou MetaBrain Intelligent Technology Co., Ltd., Jiangsu (CN)

(72) Inventors: Hongyu Zhu, Jiangsu (CN); Jian Wang, Jiangsu (CN); Dan Liu, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/981,908

(22) Filed: Dec. 16, 2024

(65) Prior Publication Data

US 2025/0117164 A1     Apr. 10, 2025

Related U.S. Application Data

(63) Continuation of application No. PCT/CN2023/081122, filed on Mar. 13, 2023.

(30) Foreign Application Priority Data

Oct. 11, 2022   (CN) .......................... 202211240058.4

(51) Int. Cl.
G06F 3/06         (2006.01)
(52) U.S. Cl.
CPC .......... G06F 3/0665 (2013.01); G06F 3/0604 (2013.01); G06F 3/0689 (2013.01)
(58) Field of Classification Search
CPC .... G06F 3/0665; G06F 3/0604; G06F 3/0689; G06F 3/06; G06F 3/061; G06F 3/0631; G06F 3/0652; G06F 3/0676; Y02D 10/00

(Continued)

(56) References Cited

U.S. PATENT DOCUMENTS 6,571,351 B1    5/2003 Mitaru et al.
2019/0317889 A1  10/2019 Chang et al.
(Continued)

FOREIGN PATENT DOCUMENTS

CN    101997918 A    3/2011
CN    102200892 A    9/2011
(Continued)

OTHER PUBLICATIONS

International Search Report cited in PCT/CN2023/081122, mailed Jun. 25, 2023, 5 pages.

(Continued)

Primary Examiner — Hua J Song
(74) Attorney, Agent, or Firm — Cooper Legal Group, LLC

(57) ABSTRACT

The present application relates to a metadata management method and apparatus, a computer device, and a storage medium. The method includes: forming a disk space by using RAIDs, dividing the disk space into blocks, combining the blocks crossing disks into one stripe, and forming stripes into a logical volume allocation unit; generating a two-level table according to the logical volume allocation unit, where the two-level table includes first table entries and second table entries, an address recorded in a first table entry is an address of a second table entry, a length of a second table entry based on a ratio of the logical volume allocation unit to a length of a single strip, and bitmaps of stripes are recorded in a second table entry; and managing metadata in the logical volume allocation unit by means of the two-level table.

20 Claims, 8 Drawing Sheets

(58) Field of Classification Search
USPC .......................................................... 711/114
See application file for complete search history.

(56) References Cited

U.S. PATENT DOCUMENTS

2020/0034229 A1* 1/2020 Schneider ............. G06F 3/0689
2021/0117112 A1   4/2021 Vankamamidi et al.

FOREIGN PATENT DOCUMENTS

| CN | 109918318 A | 6/2019 |
| CN | 111258807 A | 6/2020 |
| CN | 112596673 A | 4/2021 |
| CN | 112764680 A | 5/2021 |
| CN | 113918388 A | 1/2022 |
| CN | 115309348 A | 11/2022 |

OTHER PUBLICATIONS

Written Opinion cited in PCT/CN2023/081122, mailed Jun. 25, 2023, 6 pages.
First Office Action of corresponding CN priority application CN202211240058.4, mailed Nov. 16, 2022, 8 pages.
Notification to Grant Patent Right for Invention cited in CN202211240058.4, mailed Dec. 5, 2022, 3 pages.

* cited by examiner

```
┌─────────────────────────────────────────────────────────┐
│ forming a disk space by using a plurality of RAIDs,     │
│ dividing the disk space into a plurality of blocks,      │─── S1
│ combining the plurality of blocks into one stripe, and  │
│ forming a plurality of stripes into a logical volume    │
│ allocation unit                                          │
└─────────────────────────────────────────────────────────┘
                           │
                           ▼
┌─────────────────────────────────────────────────────────┐
│ generating a two-level table according to the logical   │
│ volume allocation unit, wherein the two-level table     │
│ comprises a first-level table and a second-level table, │
│ the first-level table comprises a plurality of first    │
│ table entries, the second-level table comprises a       │
│ plurality of second table entries, both a number of the │
│ plurality of first table entries and a number of the    │
│ second table entries are equal to a size of the disk    │─── S2
│ space divided by the logical volume allocation unit,    │
│ an association is set between the plurality of first    │
│ table entries and the plurality of second table entries,│
│ an address recorded in each of the plurality of the     │
│ first table entries is an address of a corresponding    │
│ second table entry, a length of each of the plurality of│
│ the second table entries in the second-level table based│
│ on a ratio of the logical volume allocation unit to a   │
│ length of a single strip, and bitmaps of a set of stripes│
│ are recorded in each of the plurality of second table   │
│ entries                                                  │
└─────────────────────────────────────────────────────────┘
                           │
                           ▼
┌─────────────────────────────────────────────────────────┐
│ managing metadata in the logical volume allocation unit │─── S3
│ by means of the two-level table                         │
└─────────────────────────────────────────────────────────┘
```

FIG. 2

METADATA MANAGEMENT METHOD AND APPARATUS, COMPUTER DEVICE, AND STORAGE MEDIUM

CROSS-REFERENCE TO RELATED APPLICATIONS

This application is a continuation of International Patent Application No. PCT/CN2023/081122, filed on Mar. 13, 2024, which claims priority to Chinese Patent Application No. 202211240058.4, filed on Oct. 11, 2022 in China National Intellectual Property Administration and entitled "Metadata Management Method and Apparatus, Computer Device, and Storage Medium". International Patent Application No. PCT/CN2023/081122 and Chinese Patent Application No. 202211240058.4 are hereby incorporated by reference in their entireties.

FIELD

The present application relates to the technical field of metadata organization, and in particular, to a metadata management method and apparatus, a computer device, and a storage medium.

BACKGROUND

A redundant array of independent disks (RAID) uses a plurality of independent disks to form a disk system so as to achieve better storage performance and higher reliability than a single disk. A multi-controller system uses a plurality of controllers to jointly process read-write operations of users so as to achieve performance overlay and security overlay of a plurality of controllers.

A plurality of controllers access same address space, which leads to a problem of resource access conflict. A feasible solution is to divide an address space of a disk into a plurality of controllers to avoid the resource access conflict, and address space isolation avoids inter-domain information crossing. Address division of space is carried out at a logical volume level to ensure independent access of a controller to the address space.

The controller needs to perform data configuration and recovery tasks on the array. When metadata of stripes needs to be recorded for performing data configuration and recovery tasks so as to schedule the tasks in units of stripes, including but not limited to formatting tasks, it is necessary to record whether the stripe has been formatted to ensure consistency of data verification and avoid multiple formatting. A metadata organization is in a form of a bitmap, and for an nth bit, 0 is used to describe that an nth stripe has been formatted.

The inventor realized that for the division of the stripes of the RAID based on the plurality of controllers, the single controller accesses the stripe to which it belongs. About ¼ of all the stripes are allocated to the single controller, and about ¾ of the metadata recorded by the controller does not belong to the stripes that are actually used by the controller, which undoubtedly results in a waste of space. Consequently, a metadata synchronization speed during the failure of the controller is affected.

SUMMARY

In an aspect, the present application provides a metadata management method, which includes:

forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;

generating a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

In one or more embodiment, the obtaining a bitmap stored in the target second table entry based on the second address of the target second table entry, including: data reading, data writing, data deletion, and data merging.

In one or more embodiment, the managing metadata in the logical volume allocation unit by means of the two-level table includes data reading, and a data reading step includes:
 determining a target first table entry corresponding to a strip number from the plurality of first table entries based on the length of each of the plurality of second table entries and a strip number where data needs to be modified;
 determining a first address of the target first table entry based on a length of each of the plurality of first table entries and an address of an initial first table entry;
 obtaining a second address of a target second table entry stored in the target first table entry based on the first address of the target first table entry; and
 obtaining a bitmap stored in the target second table entry based on the second address of the target second table entry.

In one or more embodiment, the managing metadata in the logical volume allocation unit by means of the two-level table includes data writing, and a data writing step includes:
 determining a target first table entry corresponding to a strip number from the plurality of first table entries based on the length of each of the plurality of second table entries and a strip number where data needs to be modified;
 determining a first address of the target first table entry based on a length of each of the plurality of first table entries and an address of an initial first table entry;
 obtaining a second address of a target second table entry stored in the target first table entry based on the first address of the target first table entry; and
 writing information to be written into the target second table entry according to the second address.

In one or more embodiment, the writing information to be written into the target second table entry according to the second address includes:

according to a controller to which the logical volume allocation unit belongs, assigning a tagged value for metadata of a stripe that belongs to the controller, and assigning an opposite tagged value for metadata of a stripe that does not belong to the controller; and writing a marked metadata into a power-off protection space.

In one or more embodiment, the writing a marked metadata into a power-off protection space includes:

compressing the marked metadata by executing compression algorithms through a plurality of controllers; and allocating the power-off protection space to compressed metadata and writing the compressed metadata into the power-off protection space.

In one or more embodiment, the writing a marked metadata into a power-off protection space includes:

in response to a determination that a preset controller is recovered after failure, copying and merging database to a target controller, where the metadata needs to be re-synchronized, the controller copies the metadata to a target controller according to a metadata synchronization rule, the metadata is saved to a power protection memory space after being merged with metadata of the target controller, and the data reading and writing are allowed to be continued after the merging of the metadata has ended.

In one or more embodiment, the managing metadata in the logical volume allocation unit by means of the two-level table includes data deletion, and a data deletion step includes:

determining a target first table entry corresponding to a strip number from the plurality of first table entries based on the length of each of the plurality of second table entries and a strip number where data needs to be modified;

determining a first address of the target first table entry based on a length of each of the plurality of first table entries and an address of an initial first table entry;

obtaining a second address of a target second table entry stored in the target first table entry based on the first address of the target first table entry; and deleting information to be deleted into the target second table entry according to the second address of the target second table entry.

In one or more embodiment, after the deleting information to be deleted into the target second table entry according to the second address of the target second table entry, the method further includes:

updating the length of each of the plurality of second table entries and addresses recorded in each of the plurality of first table entries in the two-level table, according to the logical volume allocation unit after deleting the information.

In one or more embodiment, after the deleting information to be deleted into the target second table entry according to the second address of the target second table entry, the method further includes:

in response to non-existence of preset information in the plurality of second table entries, deleting the second-level table, and setting addresses recorded in a corresponding first-level table to be invalid.

In one or more embodiment, the disk space forms a plurality of logical volume allocation units, and each of the plurality of logical volume allocation units corresponds to one controller; and in response to a determination that deleting the information causes an attributing controller of a corresponding strip to change from a first controller to a second controller, deleting information of a strip from metadata of the first controller, and inserting the information of the strip into metadata of the second controller.

In one or more embodiment, the managing metadata in the logical volume allocation unit by means of the two-level table includes data merging, and a data merging step includes:

determining a target first table entry corresponding to a strip number from the plurality of first table entries based on the length of each of the plurality of second table entries and a strip number where data needs to be modified;

determining a first address of the target first table entry based on a length of each of the plurality of first table entries and an address of an initial first table entry;

obtaining a second address of a target second table entry stored in the target first table entry based on the first address of the target first table entry; and recording information to be inserted into the target second table entry according to the second address.

In one or more embodiment, after the recording information to be inserted into the target second table entry according to the second address, the method further includes:

updating the length of each of the plurality of second table entries and the addresses recorded in each of the plurality of first table entries in the two-level table, according to the logical volume allocation unit after inserting the information.

In one or more embodiment, after the recording information to be inserted into the target second table entry according to the second address, the method further includes:

in response to a determination that space corresponding to the plurality of second table entries is insufficient, obtaining a storage space from other logical volume allocation units, adding a preset second table entry, and adding a corresponding first table entry for the preset second table entry.

In one or more embodiment, the disk space forms a plurality of logical volume allocation units, and each of the plurality of logical volume allocation units corresponds to one controller; and in response to a determination that the information inserting causes an attributing controller of a corresponding strip to change from a first controller to a second controller, deleting information of a strip from metadata of the first controller, and inserting the information of the strip into metadata of the second controller.

In one or more embodiment, the compression algorithms of the metadata is based on a form of spatial equilibrium in response to a determination that the plurality of controllers are balanced.

In one or more embodiment, the metadata management method includes:

configuring metadata used by a background task in advance in response to a determination that at least one of RAIDs starts the background task.

In one or more embodiment, the metadata management method includes: reading and returning data in a form of the compressed metadata in response to a determination that the data is read from the metadata.

In another aspect, a metadata organization apparatus is provided. The apparatus includes:

a logical volume allocation unit forming module, configured to form a disk space by using a plurality of RAIDs, divide the disk space into a plurality of blocks, combine the plurality of blocks crossing a plurality of disks into one stripe, and form a plurality of stripes into a logical volume allocation unit;

a two-level table generating module, configured to generate a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and a metadata managing module, configured to manage metadata in the logical volume allocation unit by means of the two-level table.

In a further another aspect, a computer device is provided, where the computer device includes a memory, configured to store computer-readable instructions; and one or more processors, configured to execute the computer-readable instructions, and upon execution of the computer-readable instructions, are configured to perform operations:

forming a disk space by using a plurality of RAIDs, dividing the disk space into a plurality of blocks, combining the plurality of blocks crossing a plurality of disks into one stripe, and forming a plurality of stripes into a logical volume allocation unit;

generating a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

In a still another aspect, the present application provides a computer device, which includes a memory, configured to store computer-readable instructions; and one or more processors, configured to execute the computer-readable instructions, and upon execution of the computer-readable instructions, are configured to perform operations of the above metadata management method.

In a further another aspect, the present application also provides one or more non-volatile computer-readable storage media storing computer-readable instructions, where the computer-readable instructions, when executed by one or more processors, is configured to cause the one or more processors to perform operations of the above metadata management method.

Details of one or more embodiments of the present application are provided in the accompanying drawings and descriptions below. Other features and advantages of the present application become apparent from the specification, and the accompanying drawings.

BRIEF DESCRIPTION OF THE DRAWINGS

To describe the technical solutions of the embodiments of the present application more clearly, the accompanying drawings required for describing the embodiments are introduced briefly below. Apparently, the accompanying drawings in the following description show some embodiments of the present application, and a person of ordinary skill in the art may still derive other accompanying drawings from these accompanying drawings without creative efforts.

FIG. 2 is a schematic flowchart of the metadata management method according to one or more embodiments of the present application;

DETAILED DESCRIPTION

To make the objectives, technical solutions, and advantages of the present application clearer, the following further describes the present application in detail with reference to the accompanying drawings and the embodiments. It is to be understood that the embodiments described herein are used for explaining the present application, and are not used for limiting the present application.

Figure 1:
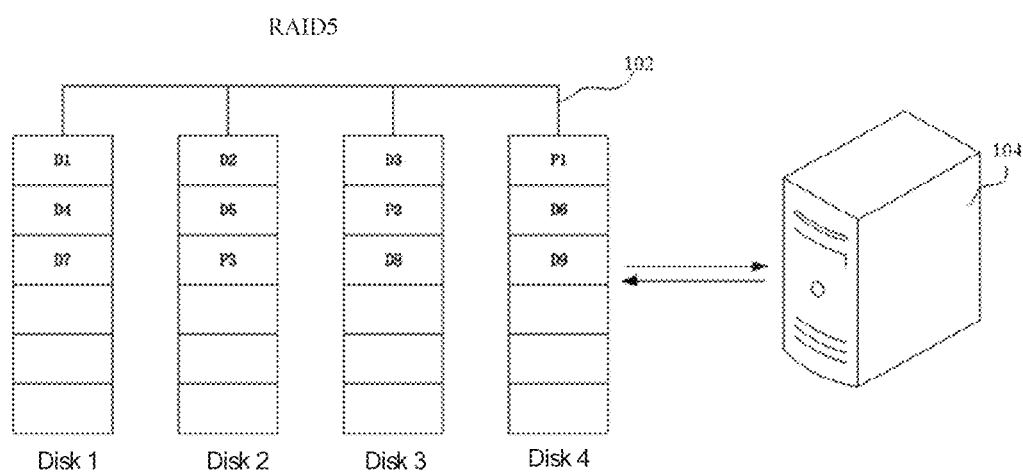
FIG. 1 is a diagram of an application environment of a metadata management method according to one or more embodiments of the present application.

A metadata management method provided in the present application may be applied to an application environment shown in FIG. 1. A plurality of redundant arrays of independent disks (RAIDs) form a disk space, the disk space is divided into a plurality of blocks, the plurality of blocks are combined into one stripe, and a plurality of stripes are formed into a logical volume allocation unit.

The RAID is abbreviated as an array herein, composed of a plurality of disks organized according to a certain spatial structure and configured to provide data access services. The array combines a plurality of blocks into a stripe, and one stripe crosses a plurality of disks and is a basic redundant unit. A number of disks crossed by a single stripe and a length of the stripe are specified directly by a user in response to a determination that the array is created. A block size is a unit of block division and is specified directly by the user in response to a determination that the array is created. A bad block is a data area that may not be read from the disk and may not be recovered by means of an array reconfiguration algorithm. in response to an existence of a bad block, it is necessary to perform data recovery.

As shown in FIG. 1, a RAID 102 communicates with a server 104 by means of connection. The RAID 102 may be, but is not limited to, disks applicable to various personal computers, notebook computers, smart phones, tablet computers, and portable wearable devices. In FIG. 1, RAID5 is taken as an example. The server 104 is a personal computer, a notebook computer, a smart phone, a tablet computer or a portable wearable device. The server 104 may also be an independent server or a server cluster composed of a plurality of servers.

In one or more embodiments, as shown in FIG. 2, a metadata management method is provided. A description is made by taking a case where the method is applied to the server 104 in FIG. 1 as an example, and the method includes following step S1 to step S3:

Step S1: forming a disk space by using RAIDs, dividing the disk space into blocks, combining the plurality of blocks crossing a plurality of disks into one stripe, and forming a plurality of stripes into a logical volume allocation unit;

Step S2: generating a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the second table entries are equal to a size of the disk space divided by the logical volume allocation unit, an association is set between the plurality of first table entries and the plurality of second table entries, an address recorded in each of the plurality of first table entries is an address of a corresponding second table entry, a length of each of the plurality of second table entries in the second-level table based on a ratio of the logical volume allocation unit to a length of a single strip, and bitmaps of a set of stripes are recorded in each of the plurality of second table entries; and Step S3: managing metadata in the logical volume allocation unit by means of the two-level table.

As shown in FIG. 1, disk space includes disk 1, disk 2, disk 3, and disk 4. Disk 1 is divided into multiple blocks such as D1, D4, and D7. Disk 2 is divided into multiple blocks such as D2, D5, and P3. Disk 3 is divided into multiple blocks such as D3, P2, and D8. Disk 4 is divided into multiple blocks such as P1, D6, and D9. Blocks D1, D2, D3, and P1 across disks 1-4 form stripe 1. Blocks D4, D5, P2, and D6 across disks 1-4 forms stripe 2. Blocks D7, P3, D8, and D9 across disks 1-4 forms stripe 3. In one or more embodiments, strip 1 and strip 2 may form a logical volume allocation unit. In one or more embodiments, strips 1, 2, and 3 may form a logical volume allocation unit. In this application, there is no limit on number of stripes in the logical volume allocation unit, which may be set according to actual needs.

The two-level table includes a first-level table and a second-level table. Both the first-level table and the second-level table include a plurality of entries. For example, the first-level table includes a plurality of first table entries. The second-level table includes a plurality of second table entries. A length of the first table entry is a length of physical memory occupied by the first table entry, and is an offset between two adjacent first table entries. A length of the second table entry is number of bits of the bitmap in the second table entry. The first table entry records address information of the second table entry corresponding to the first table entry, and the second table entry records the bitmap. The first-level table and the second-level table may be implemented through certain data structures, for example, the first-level table may be represented in array form, and the second-level table may be represented in bitmap form.

Assuming that the first table entry in the first-level table is represented by an array A [0], . . . , A [N−1] in sequence, where N represents number of first table entry first_entry in the first-level table, and sizeof (first_entry) represents the length of the first table entry. Given that an address of a first first table entry is A_entryaddr [0], then an address of a Nth first table entry is A_entryaddr [N]=A_entryaddr [0]+N*sizeof (first_dentry).

Assuming that a single second table entry in the second-level table is represented by a bitmap BitMap [M], where M represents the length of the second table entry, i.e. a number of bits stored. A value of each bit may be 0 or 1 to indicate whether a corresponding stripe has been configured. For example, a value of a target bit is 0, indicating that a stripe corresponding to the target bit has been configured. The value of the target bit is 1, indicating that the stripe corresponding to the target bit has not been configured. In response to a determination that all stripes are configured or not configured, the bit values are all 0s or 1s. At this time, the second table entries may be directly represented by 0 or 1, which may save space.

If a bitmap BitMap [M] is associated with the first table entry A [X] in the first-level table, then a stripe number S corresponding to a P-th bit in BitMap [M] is M*X+(P−1). X is greater than or equal to 0 and less than N, and P is greater than or equal to 0 and less than M.

In one or more embodiments, assuming that a size of the disk space is 5G, a logical volume allocation unit is 1G, and a length of the stripe is 2M. A length of the second table entry M=the logical volume allocation unit/the length of the strip=1G/2M=512, which means that the second table entry stores a 512 bit bitmap. A number N of the first table entries in the first-level table=the size of the disk space/the logical volume allocation unit=5G/1G=5. The first-level table includes five first table entries: A [0], A [1], A [2], A [3], and A [4]. The single second table entry in the second-level table is BitMap [512]. It should be noted that the number of second table entries in the second-level table is the same as the number of first table entries in the first-level table, that is, the number N of the second table entries in the second-level table=the size of the disk space/the logical volume allocation unit=5G/1G=5.

It should be noted that each first table entry has a corresponding second table entry, and the first table entry stores the address of the second table entry. For example, the first first table entry corresponds to the first second table entry, the second first table entry corresponds to the second second table entry, . . . , and the Nth first table entry corresponds to the Nth second table entry. Therefore, after obtaining the address of the first table entry, the address recorded in the first table entry may be read first to obtain the address of the second table entry, and then the bitmap information in the second table entry may be read based on the address of the second table entry.

For example, it is known that the address of the first first table entry is A_entryaddr [0], and the length of the first table entry is sizeof (first_entry). The address of the Nth first table entry, A_entryaddr [N], is equal to A_entryaddr [0]+ N*sizeof (first_entry). The address stored in A_entryaddr [N] is the address B_entryaddr [N] of the Nth second table entry in the second-level table. Therefore, the bitmap information in the Nth second table entry may be read based on the address B_entryaddr [N] of the Nth second table entry.

The managing metadata in the logical volume allocation unit by means of the two-level table includes data reading, data writing, data deletion or data merging.

Methods for managing the metadata in step S3 are described in detail below in a plurality of embodiments.

Figure 3:
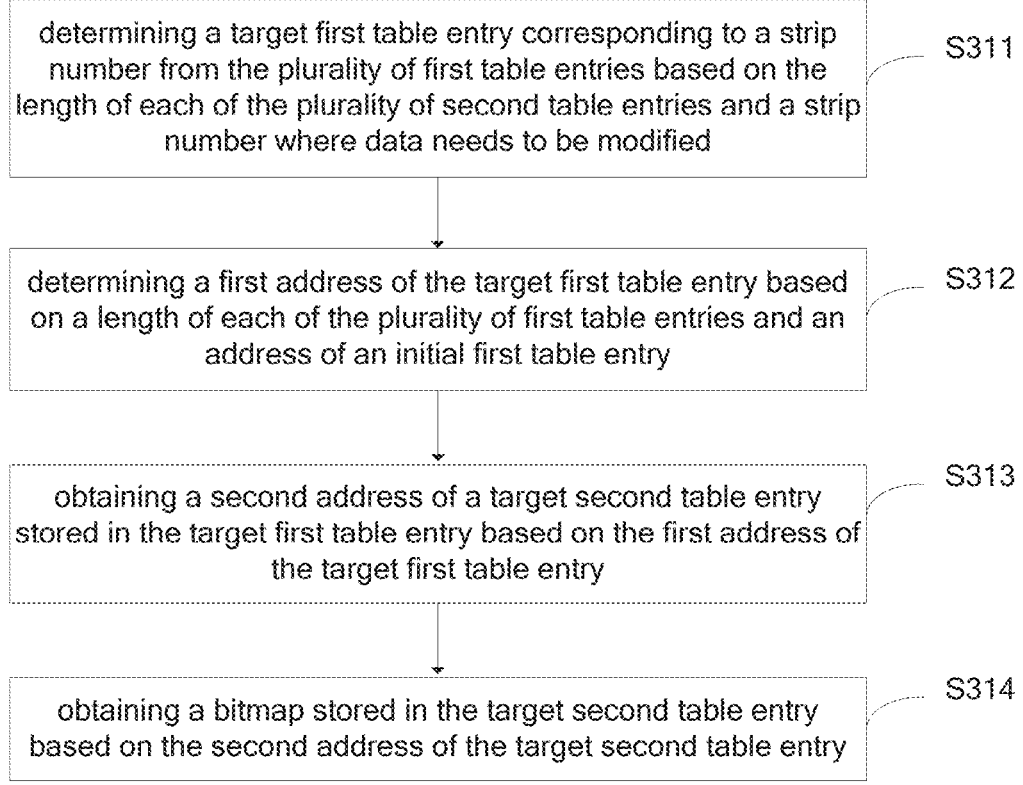
FIG. 3 is a schematic flowchart of a data reading step according to one or more embodiments of the present application.

The managing metadata in the logical volume allocation unit by means of the two-level table includes data reading, and as shown in FIG. 3, a data reading step includes:

Step S311: determining a target first table entry corresponding to a strip number from the plurality of first table entries based on the length of each of the plurality of second table entries and a strip number where data needs to be modified;

Step S312: determining a first address of the target first table entry based on a length of each of the plurality of first table entries and an address of an initial first table entry;

Step S313: obtaining a second address of a target second table entry stored in the target first table entry based on the first address of the target first table entry; and Step S314: obtaining a bitmap stored in the target second table entry based on the second address of the target second table entry.

Assuming that the strip number is S, S may be divided by the length of the second table entry to obtain the first table entry corresponding to the strip number. Divide S by the length of the second table entry and take a remainder to obtain a position in the corresponding first table entry. For example, the strip number S is taken as 1423, and since 1423/512 is rounded to 2, the first table entry corresponding to that strip number is A [2]. The address A_entryaddr [2] of the first table entry A [2] is: A_entryaddr [0]+2*sizeof (first_entry). Read the address of the target second table entry stored in the first table entry A[2] based on the address A_entryaddr [2]. Then read the bitmap in the target second table entry based on the address of the target second table entry. Then 1423/512 is rounded off to get 399, then the strip information corresponding to the strip number is stored in the (399+1)=400th bit of the target second table entry.

Figure 4:
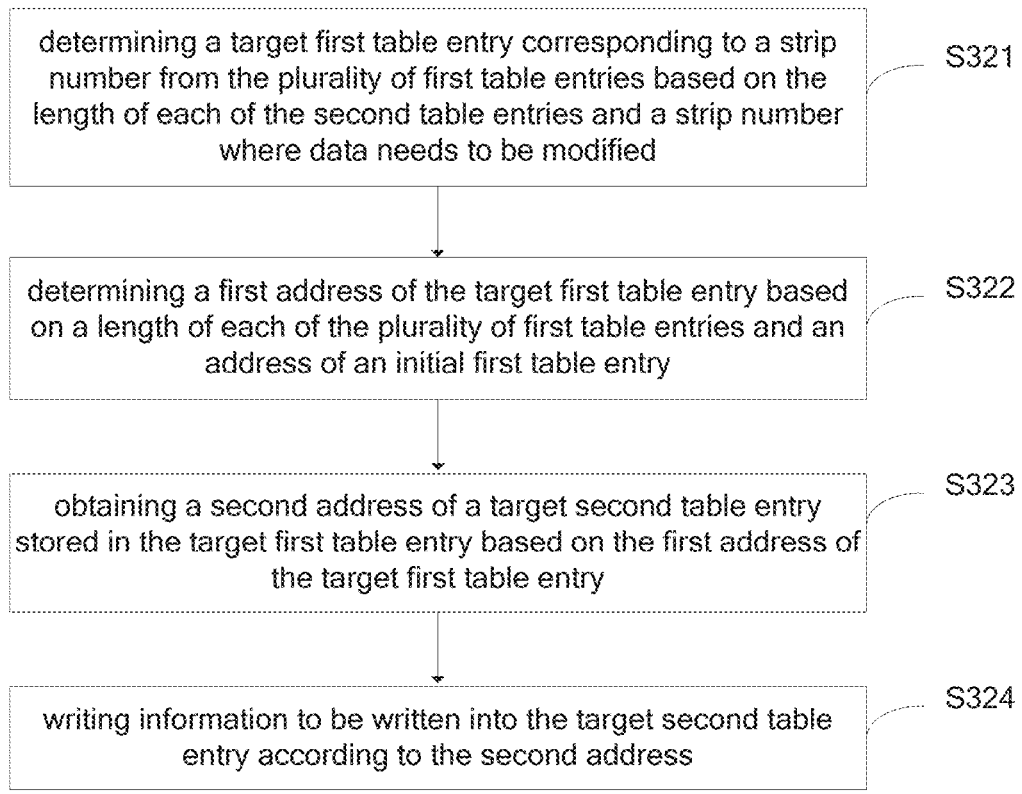
FIG. 4 is a schematic flowchart of a data writing step according to one or more embodiments of the present application.

In one or more embodiments, the managing metadata in the logical volume allocation unit by means of the two-level table includes data writing, and as shown in FIG. 4, a data writing step includes:

Step S321: determining a target first table entry corresponding to a strip number from the plurality of first table entries based on the length of each of the second table entries and a strip number where data needs to be modified;

Step S322: determining a first address of the target first table entry based on a length of each of the plurality of first table entries and an address of an initial first table entry;

Step S323: obtaining a second address of a target second table entry stored in the target first table entry based on the first address of the target first table entry; and Step S324: writing information to be written into the target second table entry according to the second address.

In the present embodiment, the writing information to be written into the target second table entry according to the second address includes: assigning a tagged value for metadata of the stripe according to a controller to which the logical volume allocation unit belongs, and assigning an opposite tagged value for metadata of a stripe that does not belong to the controller; and writing a marked metadata into a power-off protection space. The metadata is written into a power-off protection space, and a metadata bitmap is compressed in response to a determination that the data is written.

In the present embodiment, compressing the marked metadata by executing compression algorithms through a plurality of controllers; and allocating the power-off protection space to compressed metadata and writing the compressed metadata into the power-off protection space.

In the present embodiment, in response to a determination that a preset controller is recovered after failure, copying database to a target controller according to a metadata synchronization rule, where the metadata is saved to a power protection memory space after being merged with metadata of the target controller, and data reading and writing are allowed to be continued after merging of the metadata has ended.

Figure 5:
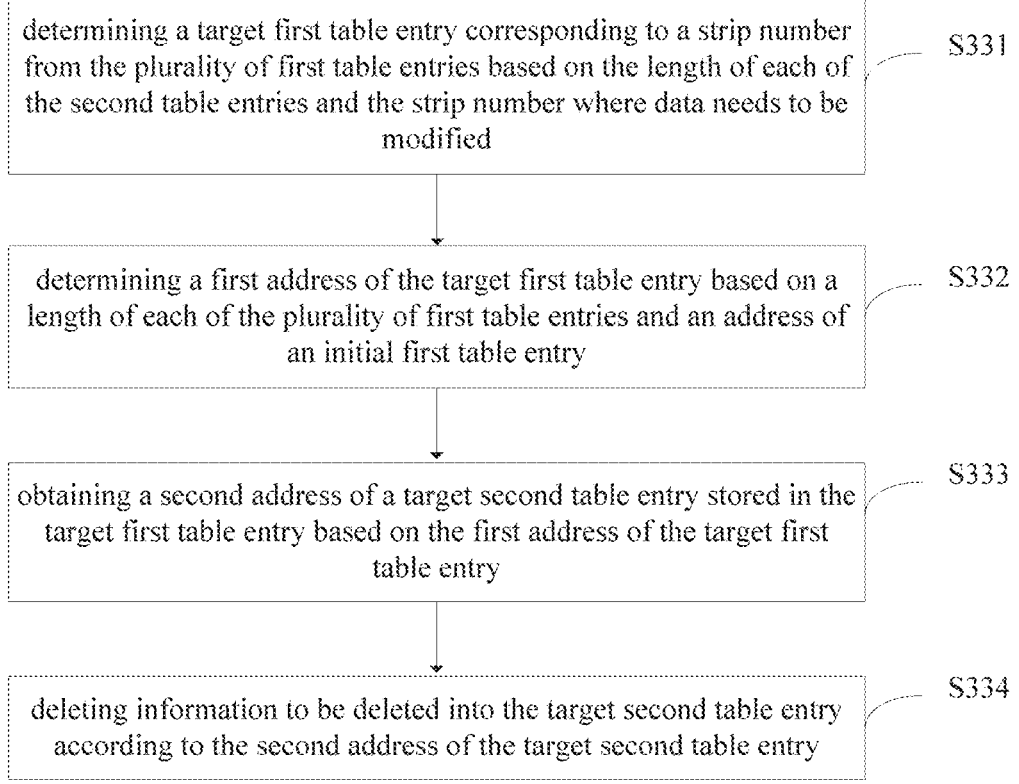
FIG. 5 is a schematic flowchart of a data deletion step according to one or more embodiments of the present application.

In one or more embodiments, the managing metadata in the logical volume allocation unit by means of the two-level table includes data deletion, and as shown in FIG. 5, a data deletion step includes:

Step S331: determining a target first table entry corresponding to a strip number from the plurality of first table entries based on the length of each of the second table entries and a strip number where data needs to be modified;

Step S332: determining a first address of the target first table entry based on a length of each of the plurality of first table entries and an address of an initial first table entry;

Step S333: obtaining a second address of a target second table entry stored in the target first table entry based on the first address of the target first table entry; and Step S334: deleting information to be deleted into the target second table entry according to the second address of the target second table entry.

As shown in FIG. 5, in the present embodiment, after the deleting information to be deleted from a space corresponding to the second-level table address, the method also includes:

Step S335: regenerating a two-level table according to the logical volume allocation unit after the information is deleted, and updating the lengths of the first-level table and second-level table and the addresses recorded in the first-level table and second-level table in the two-level table.

After the deleting information to be deleted into the target second table entry according to the second address of the target second table entry, the method further includes: in response to non-existence of preset information in the plurality of second table entries, deleting the second-level table, and setting the addresses recorded in the corresponding first-level table to be invalid.

In the present embodiment, the disk space forms a plurality of logical volume allocation units, and each of the plurality of logical volume allocation units corresponds to one controller; and in response to a determination that information deleting cause an attributing controller of a corresponding strip to change from a first controller to a second controller, deleting information of a strip from metadata of the first controller, and inserting the information of the strip into metadata of the second controller.

Figure 6:
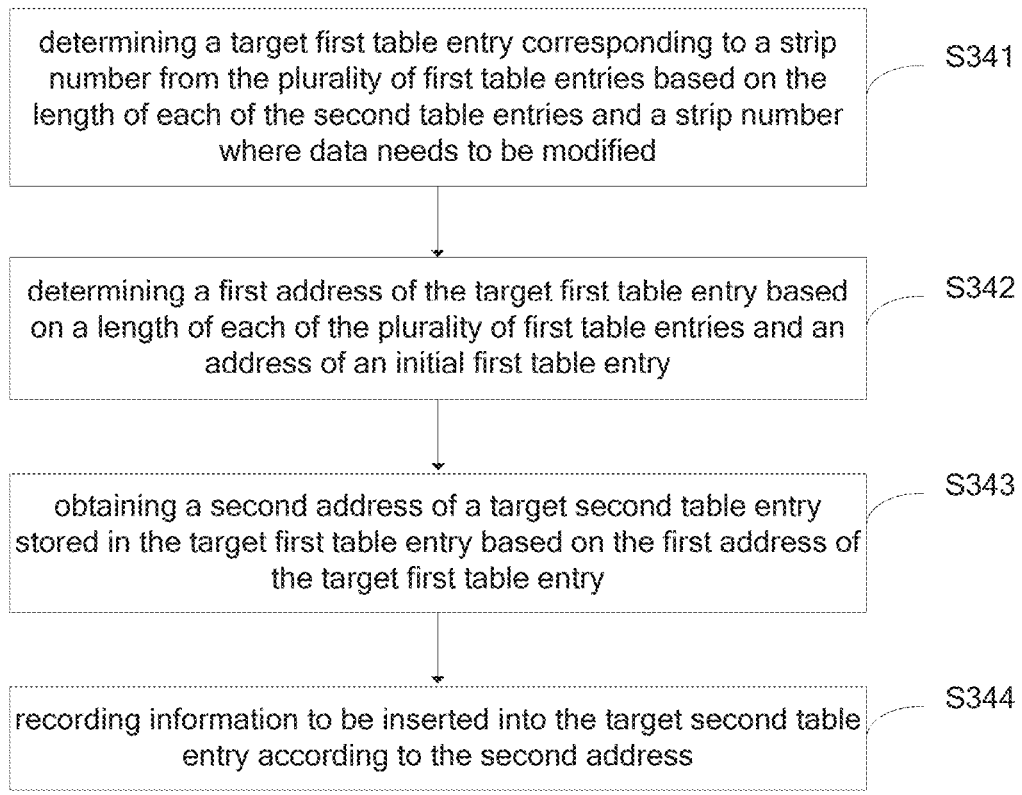
FIG. 6 is a schematic flowchart of a data merging step according to one or more embodiments of the present application.

In one or more embodiments, the managing metadata in the logical volume allocation unit by means of the two-level table includes data merging, and as shown in FIG. 6, a data merging step includes:

Step S341: determining a target first table entry corresponding to a strip number from the plurality of first table entries based on the length of each of the second table entries and a strip number where data needs to be modified;

Step S342: determining a first address of the target first table entry based on a length of each of the plurality of first table entries and an address of an initial first table entry;

Step S343: obtaining a second address of a target second table entry stored in the target first table entry based on the first address of the target first table entry; and Step S344: recording information to be inserted into the target second table entry according to the second address.

As shown in FIG. 6, in the present embodiment, after the recording information to be inserted into the target second table entry according to the second address, the method also includes:

Step S345: updating the lengths of each of the plurality of second table entries and the addresses recorded in each of the plurality of first table entries in the two-level table, according to logical volume allocation unit after inserting information.

After the recording information to be inserted into the target second table entry according to the second address, the method includes: in response to a determination that space corresponding to the plurality of second table entries is insufficient, obtaining a storage space from other logical volume allocation units, adding a preset second table entry, and adding a corresponding first table entry for the preset second table entry.

In the present embodiment, the disk space forms a plurality of logical volume allocation units, and each logical volume allocation unit corresponds to one controller. In response to a determination that information inserting causes an attributing controller of a corresponding strip to change from a first controller to a second controller, the information of the strip with a change in ownership division needs to be migrated the old controller to a new controller. At this time, deleting information of a strip from metadata of the first controller, and inserting the information of the strip into metadata of the second controller.

In the metadata management method, a compressed metadata form used by RAID is provided, whereby the metadata space occupation is reduced compared with an old metadata organization form. And moreover, the metadata synchronization time during the failure and recovery of a controller may be reduced, thereby improving system reliability.

When in use, the RAID needs to first configure metadata used by a background task when starting the background task, for example, including but is not limited to formatting and reconfiguration. It is necessary to configure the metadata to describe which spatial area of the RAID has been formatted and which spatial area is not formatted. The above area division of the RAID may be carried out in units of stripes of the RAID, or may be carried out in units of a line of blocks of the RAID.

The metadata configuration is taken as one of metadata updating forms. A tagged value is configured for metadata of a spatial area according to a controller to which the spatial area of the RAID belongs, and an opposite tagged value is configured for metadata of a spatial area that does not belong to the controller. The opposite tagged value is equivalent to a tagged value of a corresponding task that has been completed, the metadata is written into the power-off protection space, and the metadata bitmap is compressed in response to a determination that the data is written. When the opposite tagged value equivalent to the tagged value of the corresponding task that has been completed is used for a metadata organization form of a multi-controller RAID system, for a certain array, a certain controller processes a partial address space of the array, and the description outside the partial address space from the perspective of the controller is the same as the description of completing the task.

The metadata is compressed by using the compression algorithm, the compressed data is written into the power-off protection space, and a plurality of controllers all execute the same compression algorithm. Since spatial areas to which the controllers respectively belong are different, the compressed metadata is different, and the space occupation is different. The power-off protection space is allocated according to the compressed metadata space. It should be noted that the compression algorithm used by the metadata of the present application is a proposed metadata organization form, and is not equivalent to a compression and decompression tool of Windows, but a data structure which allows data reading and writing, which reduces the space compared with a bitmap; and it is mentioned below that reading without decompression is also the same meaning.

The metadata needs to be re-synchronized during the failure or recovery of the controller, the controller copies the metadata to a target controller according to a metadata synchronization rule, the metadata is saved to a power protection memory space after being merged with metadata of the target controller, and the data reading and writing are allowed to be continued after the merging of the metadata has ended during the failure or recovery of the controller.

Data is read and returned in a form of the compressed metadata in response to a determination that the data is read from the metadata. In response to a determination that the metadata is written, old metadata is read first, a specified position of the metadata is updated, and the metadata is compressed and written into the power protection memory. Besides the initialization of the metadata, the synchronized controllers need to execute the above metadata writing logic at the same time to keep the synchronization of the controllers written with the metadata.

The key of the compression algorithm of the metadata is to perform the compression in the form of spatial equilibrium when a plurality of controllers are balanced. Since the logical volume space allocation unit is far greater than the RAID, a plurality of adjacent stripes are most possibly allocated to the same controller. The form with stripes as division units is taken as an example. The compression adopts the form of a two-level table, a subscript value recorded at a first level of the table corresponds to a high-bit portion of the serial number of a stripe, and values stored at the first level correspond to a second-level subscript of the table. A second level of the table records a bitmap of a group of stripes, and the described meaning is the same as the meaning of an old bitmap. A data structure is described herein, and the data structure is used to substitute the bitmap to store the metadata; and the compression described herein is not equivalent to the compression tool of Windows, and using the data structure for storage may play a role in saving the space.

Define the length of each second table entry in the second-level table based on the ratio of the length of the logical volume allocation unit to a RAID area partition unit (i.e. stripe). The length of the first level is equal to the number of area partitions divided by the length of the second level of the table. For example, for a logical volume allocation unit of 1024M and the RAID area partition unit of 2M, the length of each second table entry in the second-level table is equal to 1024M/2M=512. Therefore, 512 bits is used to identify the partition unit of 512 for each second table entry, corresponding to 512 stripes. The length of the first table entry is the length of the physical memory occupied by the first table entry, and is the offset between two adjacent first table entries.

Compressed metadata does not need to be decompressed when read. Determining a target first table entry corresponding to a strip number from the first table entries based on the length of each second table entry and the strip number where data needs to be modified. Determining a first address of the target first table entry based on a length of each first table entry and an address of an initial first table entry. Obtaining a second address of a target second table entry stored in the target first table entry based on the first address of the target first table entry. Obtaining a bitmap stored in the target second table entry based on the second address of the target second table entry.

This metadata format allows real-time compression of metadata by supporting deletion: determining a target first table entry corresponding to a strip number from the first table entries based on the length of each of the second table entries and the strip number where data needs to be modified; determining a first address of the target first table entry based on a length of each first table entry and an address of an initial first table entry; obtaining a second address of a target second table entry stored in the target first table entry based on the first address of the target first table entry; and deleting information to be deleted into the target second table entry according to the second address of the target second table entry. In response to non-existence of preset information in the plurality of second table entries, deleting the second-level table, and setting the addresses recorded in the corresponding first-level table to be invalid.

It may be understood that the first table entry stores the physical address of the second table entry, that is, the first table entry is the index of the second table entry. Space saving is because the second level of the table does not exist, which may save space in this case. The absence of any remaining information in the space corresponding to the address of the second-level table means that there is no more data to be stored in the second-level table, which is one of the two situations described above: "completed" or "not belonging to the controller".

When the ownership division of a strip changes, the information of the strip whose ownership division has changed needs to be migrated from the old controller to the new controller. At this time, the information of the strip in the old controller is deleted and inserted into the metadata of the new controller.

This metadata format allows for metadata merging by supporting insertion: determining a target first table entry corresponding to a strip number from the first table entries based on the length of each of the second table entries and the strip number where data needs to be modified; determining a first address of the target first table entry based on a length of each of the plurality of first table entries and an address of an initial first table entry; obtaining a second address of a target second table entry stored in the target first table entry based on the first address of the target first table entry; in response to a determination that the second address is valid, obtaining the bitmap stored in the target second table entry based on the second address. Otherwise, apply for power protection memory space to create the target second table entry and record the address of the target second table entry in the target first table entry; determining the position of the bit to be inserted by the strip number and the length of each second table entry, and record the information to be inserted at the position of the bit to be inserted.

Therefore, by managing the metadata in the form of two-level table, the metadata management method and apparatus, the computer device, and the storage medium have the real-time data compression characteristics. When the metadata is updated, the space occupied by the updated metadata is reduced compared with an old metadata space, which is a characteristic that the bitmap form does not possess. According to the present application, when the metadata in the logical volume allocation unit is managed by means of the two-level table, the space occupied by the metadata is reduced compared with an old metadata organization form; and moreover, the metadata synchronization time during the failure or recovery of the controller may be reduced, thereby improving the system reliability.

It should be understood that although each step in the flowcharts of FIG. 2 to FIG. 6 is shown by the sequence as indicated by the arrows, these steps are not necessarily executed in sequence as indicated by the arrows. Unless explicitly stated in the description, the execution of these steps is not strictly limited in sequence, and these steps may be executed in other sequences. Moreover, at least some steps in FIG. 2 to FIG. 6 may include a plurality of sub-steps or phases, which are not necessarily executed at the same time, but may be executed at different moments, and the execution sequence of these sub-steps or phases is not necessarily sequential, but may be executed with other steps or at least some sub-steps or phases of other steps.

Figure 7:
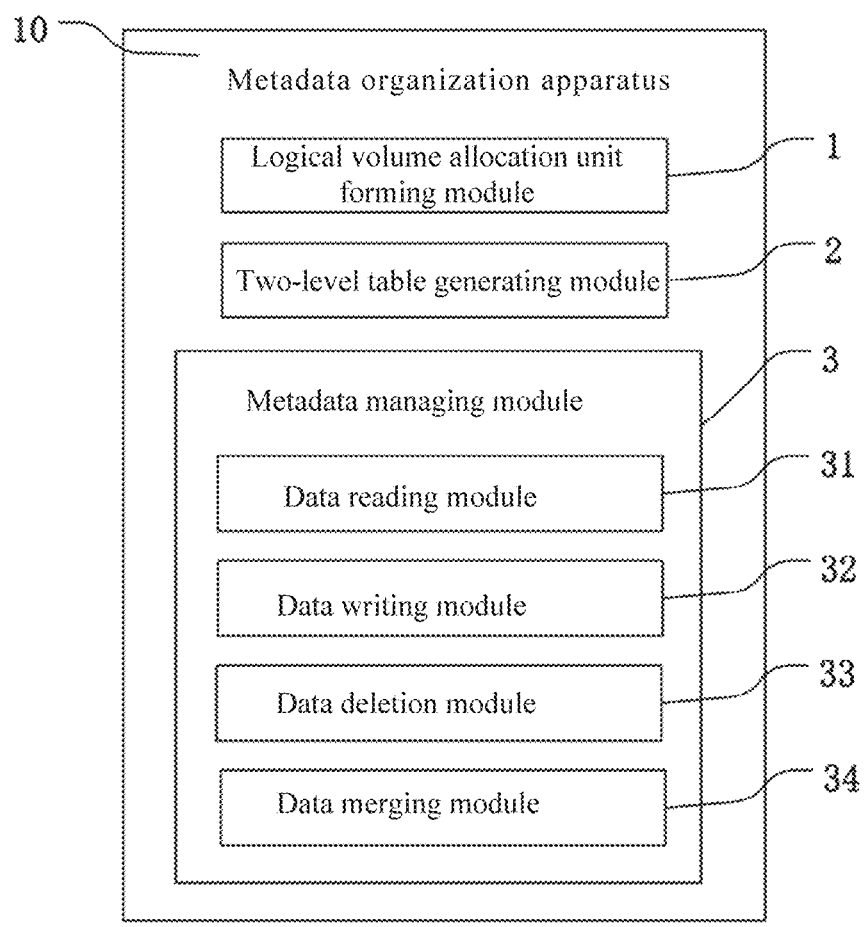
FIG. 7 is a structural block diagram of a metadata organization apparatus according to one or more embodiments of the present application.

In one or more embodiments, as shown in FIG. 7, a metadata organization apparatus 10 is provided, which includes: a logical volume allocation unit forming module 1, a two-level table generating module 2, and a metadata managing module 3.

The logical volume allocation unit forming module 1 is configured to a disk space by using a plurality of redundant arrays of independent disks (RAIDs), divide the disk space into a plurality of blocks, combine the plurality of blocks crossing a plurality of disks into one stripe, and form a plurality of stripes into a logical volume allocation unit.

The two-level table generating module 2 is configured to generate a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry, a length of each of the plurality of second table entries in the second-level table based on a ratio of the logical volume allocation unit to a length of a single strip, and bitmaps of a set of stripes are recorded in each of the plurality of second table entries.

The metadata managing module 3 is configured to manage metadata in the logical volume allocation unit by means of the two-level table.

The metadata managing module 3 manages the metadata in the logical volume allocation unit by means of the two-level table, which includes data reading, data writing, data deletion or data merging.

Functional structures of the metadata managing module 3 are set according to the content of data reading, data writing, data deletion or data merging. The metadata managing module 3 includes a data reading module 31, a data writing module 32, a data deletion module 33 or a data merging module 34. For understanding the functions of the data reading module 31, the data writing module 32, the data deletion module 33 or the data merging module 34, refer to the plurality of embodiments of the metadata management method described above.

As shown in FIG. 3, the data reading module 31 is configured to determine a target first table entry corresponding to a strip number from the plurality of first table entries based on the length of each of the plurality of second table entries and the strip number where data needs to be modified; determine a first address of the target first table entry based on a length of each of the plurality of first table entries and an address of an initial first table entry; obtain a second address of a target second table entry stored in the target first table entry based on the first address of the target first table entry; and obtain a bitmap stored in the target second table entry based on the second address of the target second table entry.

As shown in FIG. 4, the data writing module 32 is configured to determine a target first table entry corresponding to a strip number from the plurality of first table entries based on the length of each of the plurality of second table entries and a strip number where data needs to be modified; determine a first address of the target first table entry based on a length of each of the plurality of first table entries and an address of an initial first table entry; obtain a second address of a target second table entry stored in the target first table entry based on the first address of the target first table entry; and writing information to be written into the target second table entry according to the second address.

In the present embodiment, in response to a determination that the writing information is to be written into the target second table entry according to the second address, assigning a tagged value for metadata of a stripe that belongs to the controller according to a controller to which the logical volume allocation unit belongs, and assigning an opposite tagged value for metadata of a stripe that does not belong to the controller; and writing a marked metadata into a power-off protection space.

In the present embodiment, compressing the marked metadata by executing compression algorithms through a plurality of controllers; and allocating the power-off protection space to compressed metadata and writing the compressed metadata into the power-off protection space.

In the present embodiment, in response to a determination that the controller is recovered after failure, the metadata needs to be re-synchronized, the controller copies the metadata to a target controller according to a metadata synchronization rule, the metadata is saved to a power protection memory space after being merged with metadata of the target controller, and the data reading and writing are allowed to be continued after the merging of the metadata has ended.

As shown in FIG. 5, the data deletion module 33 is configured to determine a target first table entry corresponding to a strip number from the plurality of first table entries based on the length of each of the plurality of second table entries and a strip number where data needs to be modified; determine a first address of the target first table entry based on a length of each of the plurality of first table entries and an address of an initial first table entry; obtain a second address of a target second table entry stored in the target first table entry based on the first address of the target first table entry; and deleting information to be deleted into the target second table entry according to the second address of the target second table entry.

In response to non-existence of preset information in the plurality of second table entries, deleting the second-level table, and setting addresses recorded in a corresponding first-level table to be invalid.

In the present embodiment, the disk space forms a plurality of logical volume allocation units, and each logical volume allocation unit corresponds to one controller. In response to a determination that information deleting causes an attributing controller of a corresponding strip to change from a first controller to a second controller, deleting information of a strip from metadata of the first controller, and inserting the information of the strip into metadata of the second controller.

As shown in FIG. 6, the data merging module 34 is configured to determine a target first table entry corresponding to a strip number from the plurality of first table entries based on the length of each of the plurality of second table entries and a strip number where data needs to be modified; determine a first address of the target first table entry based on a length of each of the plurality of first table entries and an address of an initial first table entry; obtain a second address of a target second table entry stored in the target first table entry based on the first address of the target first table entry; recording information to be inserted into the target second table entry according to the second address; and updating the lengths of each of the plurality of second table entries and addresses recorded in each of the plurality of first table entries in the two-level table, according to the logical volume allocation unit after inserting information.

During regeneration of the two-level table, in response to a determination that space corresponding to the plurality of second table entries is insufficient, obtaining a storage space from other logical volume allocation units, adding a preset second table entry, and adding a corresponding first table entry for the preset second table entry.

In the present embodiment, the disk space forms a plurality of logical volume allocation units, and each logical volume allocation unit corresponds to one controller. In response to a determination that information inserting causes an attributing controller of a corresponding strip to change from a first controller to a second controller, deleting information of a strip from metadata of the first controller, and inserting the information of the strip into metadata of the second controller.

Regarding the limitation to the metadata organization apparatus, refer to the limitation to the metadata management method described above, which is not repeated herein. Each module in the foregoing metadata organization apparatus may be implemented entirely or partially through software, hardware, or a combination thereof. The foregoing modules may be embedded to or may be independent from a processor in a computer device in a hardware form, and may also be stored in a memory in the computer device in a software form, so as to be invoked by the processor to execute the operations corresponding to each module.

In one or more embodiments, a computer device is provided. The computer device may be a server, and an internal structure of the computer device may be shown in FIG. 8. The computer device includes one or more processors, a memory, a network interface, and a database connected by means of a system bus. The processor of the computer device is configured to provide computation and control ability. The memory of the computer device includes a non-volatile storage medium and an internal memory. The non-volatile storage medium stores an operating system, computer-readable instructions, and a database. The internal memory provides an environment for running the operating system and the computer-readable instructions in the non-volatile storage medium. The database of the computer device is configured to store metadata organization data. The network interface of the computer device is configured to communicate with an external RAID by means of network connection. The computer-readable instructions, when executed by the processor, implement a metadata management method.

Figure 8:
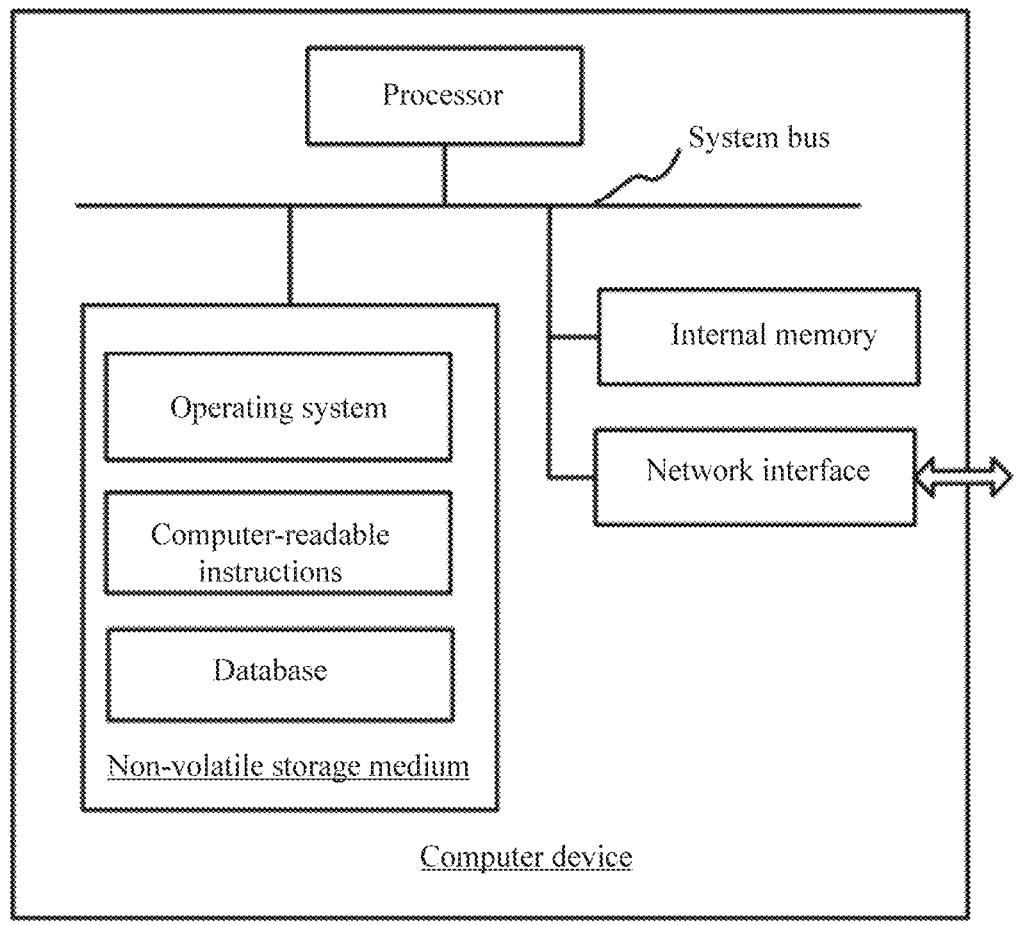
FIG. 8 is a diagram of an internal structure of a computer device according to one or more embodiments.

A person skilled in the art may understand that, the structure shown in FIG. 8 is merely a block diagram of a partial structure related to a solution in the present application, and does not constitute a limitation to the computer device to which the solution in the present application is applied. In some embodiments, the computer device may include more components or fewer components than those shown in the figure, or some components may be combined, or a different component deployment may be used.

In one or more embodiments, a computer device is provided, which includes a memory, configured to store computer-readable instructions; and one or more processors, configured to execute the computer-readable instructions, and upon execution of the computer-readable instructions, are configured to perform operations including:

forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;

generating a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

In one embodiment, the processors, upon execution of the computer-readable instructions, also perform the data reading, and as shown in FIG. 3, a data reading step includes:

Step S311: determining a target first table entry corresponding to a strip number from the plurality of first table entries based on the length of each of the plurality of second table entries and a strip number where data needs to be modified;

Step S312: determining a first address of the target first table entry based on a length of each of the plurality of first table entries and an address of an initial first table entry;

Step S313: obtaining a second address of a target second table entry stored in the target first table entry based on the first address of the target first table entry; and Step S314: obtaining a bitmap stored in the target second table entry based on the second address of the target second table entry.

In one embodiment, the processors, upon execution of the computer-readable instructions, also perform the data writing, and as shown in FIG. 4, a data writing step includes:

Step S321: determining a target first table entry corresponding to a strip number from the plurality of first table entries based on the length of each of the second table entries and a strip number where data needs to be modified;

Step S322: determining a first address of the target first table entry based on a length of each of the plurality of first table entries and an address of an initial first table entry;

Step S323: obtaining a second address of a target second table entry stored in the target first table entry based on the first address of the target first table entry; and Step S324: writing information to be written into the target second table entry according to the second address.

In the present embodiment, the writing information to be written into the target second table entry according to the second address includes: assigning a tagged value for metadata of the stripe according to a controller to which the logical volume allocation unit belongs, and assigning an opposite tagged value for metadata of a stripe that does not belong to the controller; and writing a marked metadata into a power-off protection space. The metadata is written into a power-off protection space, and a metadata bitmap is compressed in response to a determination that the data is written.

In the present embodiment, compressing the marked metadata by executing compression algorithms through a plurality of controllers; and allocating the power-off protection space to compressed metadata and writing the compressed metadata into the power-off protection space.

In the present embodiment, in response to a determination that a preset controller is recovered after failure, copying database to a target controller according to a metadata synchronization rule, where the metadata is saved to a power protection memory space after being merged with metadata of the target controller, and data reading and writing are allowed to be continued after merging of the metadata has ended.

In one embodiment, the processors, upon execution of the computer-readable instructions, also perform the data deletion, and as shown in FIG. 5, a data deletion step includes:

Step S331: determining a target first table entry corresponding to a strip number from the plurality of first table entries based on the length of each of the second table entries and a strip number where data needs to be modified;

Step S332: determining a first address of the target first table entry based on a length of each of the plurality of first table entries and an address of an initial first table entry;

Step S333: obtaining a second address of a target second table entry stored in the target first table entry based on the first address of the target first table entry; and Step S334: deleting information to be deleted into the target second table entry according to the second address of the target second table entry.

As shown in FIG. 5, in the present embodiment, after the deleting information to be deleted into the target second table entry according to the second address of the target second table entry, the method also includes:

Step S335: according to the logical volume allocation unit after the information is deleted, and updating the lengths of the first-level table and second-level table and the addresses recorded in the first-level table and second-level table in the two-level table.

After the deleting information to be deleted into the target second table entry according to the second address of the target second table entry, the method further includes: in response to non-existence of preset information in the plurality of second table entries, deleting the second-level table, and setting the addresses recorded in the corresponding first-level table to be invalid.

In the present embodiment, the disk space forms a plurality of logical volume allocation units, and each of the plurality of logical volume allocation units corresponds to one controller; and in response to a determination that information deleting cause an attributing controller of a corresponding strip to change from a first controller to a second controller, deleting information of a strip from metadata of the first controller, and inserting the information of the strip into metadata of the second controller.

In one embodiment, the processors, upon execution of the computer-readable instructions, also perform the data merging, and as shown in FIG. 6, a data merging step includes:

Step S341: determining a target first table entry corresponding to a strip number from the plurality of first table entries based on the length of each of the second table entries and a strip number where data needs to be modified;

Step S342: determining a first address of the target first table entry based on a length of each of the plurality of first table entries and an address of an initial first table entry;

Step S343: obtaining a second address of a target second table entry stored in the target first table entry based on the first address of the target first table entry; and Step S344: recording information to be inserted into the target second table entry according to the second address.

As shown in FIG. 6, in the present embodiment, after the recording information to be inserted into the target second table entry according to the second address, the method also includes:

Step S345: updating the lengths of each of the plurality of second table entries and the addresses recorded in each of the plurality of first table entries in the two-level table, according to logical volume allocation unit after inserting information.

After the recording information to be inserted into the target second table entry according to the second address, the method includes: in response to a determination that space corresponding to the plurality of second table entries is insufficient, obtaining a storage space from other logical volume allocation units, adding a preset second table entry, and adding a corresponding first table entry for the preset second table entry.

In the present embodiment, the disk space forms a plurality of logical volume allocation units, and each logical volume allocation unit corresponds to one controller. In response to a determination that information inserting causes an attributing controller of a corresponding strip to change from a first controller to a second controller, the information of the strip with a change in ownership division needs to be migrated an the old controller to a new controller. At this time, deleting information of a strip from metadata of the first controller, and inserting the information of the strip into metadata of the second controller.

Limitation regarding the steps implemented by the processor when executing the computer-readable instructions may be found in the limitation of the metadata organization method described above, which is not repeated herein.

In one or more embodiments, a non-volatile computer-readable storage medium is provided. The non-volatile computer-readable storage medium stores computer-readable instructions, and the computer-readable instructions, when executed by one or more processors, is configured to cause the one or more processors to perform operations including:

forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;

generating a two-level table according to the logical volume allocation unit, where the two-level table includes a first-level table and a second-level table, the first-level table includes a plurality of first table entries, the second-level table includes a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

In one embodiment, the computer-readable instructions, when executed by the one or more processors, also implement the data reading, and as shown in FIG. 3, a data reading step includes:

Step S311: determining a target first table entry corresponding to a strip number from the plurality of first table entries based on the length of each of the plurality of second table entries and a strip number where data needs to be modified;

Step S312: determining a first address of the target first table entry based on a length of each of the plurality of first table entries and an address of an initial first table entry;

Step S313: obtaining a second address of a target second table entry stored in the target first table entry based on the first address of the target first table entry; and Step S314: obtaining a bitmap stored in the target second table entry based on the second address of the target second table entry.

In one embodiment, the computer-readable instructions, when executed by the one or more processors, also implement the data writing, and as shown in FIG. 4, a data writing step includes:

Step S321: determining a target first table entry corresponding to a strip number from the plurality of first table entries based on the length of each of the second table entries and a strip number where data needs to be modified;

Step S322: determining a first address of the target first table entry based on a length of each of the plurality of first table entries and an address of an initial first table entry;

Step S323: obtaining a second address of a target second table entry stored in the target first table entry based on the first address of the target first table entry; and Step S324: writing information to be written into the target second table entry according to the second address.

In the present embodiment, the writing information to be written into the target second table entry according to the second address includes: assigning a tagged value for metadata of the stripe according to a controller to which the logical volume allocation unit belongs, and assigning an opposite tagged value for metadata of a stripe that does not belong to the controller; and writing a marked metadata into a power-off protection space. The metadata is written into a power-off protection space, and a metadata bitmap is compressed in response to a determination that the data is written.

In the present embodiment, compressing the marked metadata by executing compression algorithms through a plurality of controllers; and allocating the power-off protection space to compressed metadata and writing the compressed metadata into the power-off protection space.

In the present embodiment, in response to a determination that a preset controller is recovered after failure, copying database to a target controller according to a metadata synchronization rule, where the metadata is saved to a power protection memory space after being merged with metadata of the target controller, and data reading and writing are allowed to be continued after merging of the metadata has ended.

In one embodiment, the computer-readable instructions, when executed by the one or more processors, also implement the data deletion, and as shown in FIG. 5, a data deletion step includes:

Step S331: determining a target first table entry corresponding to a strip number from the plurality of first table entries based on the length of each of the second table entries and a strip number where data needs to be modified;

Step S332: determining a first address of the target first table entry based on a length of each of the plurality of first table entries and an address of an initial first table entry;

Step S333: obtaining a second address of a target second table entry stored in the target first table entry based on the first address of the target first table entry; and Step S334: deleting information to be deleted into the target second table entry according to the second address of the target second table entry.

As shown in FIG. 5, in the present embodiment, after the deleting information to be deleted into the target second table entry according to the second address of the target second table entry, the method also includes:

Step S335: according to the logical volume allocation unit after the information is deleted, and updating the lengths of the first-level table and second-level table and the addresses recorded in the first-level table and second-level table in the two-level table.

After the deleting information to be deleted into the target second table entry according to the second address of the target second table entry, the method further includes: in response to non-existence of preset information in the plurality of second table entries, deleting the second-level table, and setting the addresses recorded in the corresponding first-level table to be invalid.

In the present embodiment, the disk space forms a plurality of logical volume allocation units, and each of the plurality of logical volume allocation units corresponds to one controller; and in response to a determination that information deleting cause an attributing controller of a corresponding strip to change from a first controller to a second controller, deleting information of a strip from metadata of the first controller, and inserting the information of the strip into metadata of the second controller.

In one embodiment, the computer-readable instructions, when executed by the one or more processors, also implement the data merging, and as shown in FIG. 6, a data merging step includes:

Step S341: determining a target first table entry corresponding to a strip number from the plurality of first table entries based on the length of each of the second table entries and a strip number where data needs to be modified;

Step S342: determining a first address of the target first table entry based on a length of each of the plurality of first table entries and an address of an initial first table entry;

Step S343: obtaining a second address of a target second table entry stored in the target first table entry based on the first address of the target first table entry; and Step S344: recording information to be inserted into the target second table entry according to the second address.

As shown in FIG. 6, in the present embodiment, after the recording information to be inserted in a space corresponding to the second-level table address, the method also includes:

updating the lengths of each of the plurality of second table entries and the addresses recorded in each of the plurality of first table entries in the two-level table, according to logical volume allocation unit after inserting information.

After the recording information to be inserted into the target second table entry according to the second address, the method includes: in response to a determination that space corresponding to the plurality of second table entries is insufficient, obtaining a storage space from other logical volume allocation units, adding a preset second table entry, and adding a corresponding first table entry for the preset second table entry.

In the present embodiment, the disk space forms a plurality of logical volume allocation units, and each logical volume allocation unit corresponds to one controller. In response to a determination that information inserting causes an attributing controller of a corresponding strip to change from a first controller to a second controller, the information of the strip with a change in ownership division needs to be migrated the old controller to a new controller. At this time, deleting information of a strip from metadata of the first controller, and inserting the information of the strip into metadata of the second controller.

Limitation regarding the steps implemented by the processor when executing the computer-readable instructions may be found in the limitation of the metadata organization method described above, which is not repeated herein.

Those of ordinary skill in the art may understand that implementing all or part of the process in the method of the above-mentioned embodiments may be completed by instructing related hardware through computer-readable instructions. The above-mentioned instructions may be stored in a non-volatile computer-readable storage medium, and when executed, the computer-readable instructions may include the process of the embodiments of the above-mentioned method. Any reference to memories, storage, database or other media used in the embodiments provided in the present application may include non-volatile and/or volatile memory. The non-volatile memory may include a read only memory (ROM), a programmable ROM (PROM), an electronic programmable ROM (EPROM), and an electronic erasable programmable ROM (EEPROM) or flash memory. The volatile memory may include a random-access memory (RAM) and/or external cache memory. As for illustration rather than limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), memory bus (Rambus) direct RAM (RDRAM) and direct memory bus dynamic RAM (DRDRAM), and memory bus dynamic RAM (RDRAM), etc.

Technical features of the foregoing embodiments may be randomly combined. To make description concise, not all possible combinations of the technical features in the foregoing embodiments are described. However, the combinations of these technical features shall be considered as falling within the scope recorded by the present specification provided that no conflict exists.

The foregoing embodiments describe several implementations of the present application, which are described specifically and in detail, but may not be construed as a limitation to the patent scope of the present application. It is to be noted that for a person of ordinary skill in the art, several transformations and improvements may be made without departing from the idea of the present application. These transformations and improvements belong to the protection scope of the present application. Therefore, the protection scope of the patent of the present application shall be subject to the appended claims.

The invention claimed is:

1. A metadata management method, comprising:
    forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;
    generating a two-level table according to the logical volume allocation unit, wherein the two-level table comprises a first-level table and a second-level table, the first-level table comprises a plurality of first table entries, the second-level table comprises a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and
    managing metadata in the logical volume allocation unit by means of the two-level table.

2. The metadata management method according to claim 1, wherein the managing metadata in the logical volume allocation unit by means of the two-level table comprises data reading, and a data reading step comprises:
    determining a target first table entry corresponding to a strip number from the plurality of first table entries based on the length of each of the plurality of second table entries and a strip number where data needs to be modified;
    determining a first address of the target first table entry based on a length of each of the plurality of first table entries and an address of an initial first table entry;
    obtaining a second address of a target second table entry stored in the target first table entry based on the first address of the target first table entry; and
    obtaining a bitmap stored in the target second table entry based on the second address of the target second table entry.

3. The metadata management method according to claim 2, wherein the obtaining a bitmap stored in the target second table entry based on the second address of the target second table entry, comprises:
    data reading, data writing, data deletion, and data merging.

4. The metadata management method according to claim 1, wherein the managing metadata in the logical volume allocation unit by means of the two-level table comprises data writing, and a data writing step comprises:
    determining a target first table entry corresponding to a strip number from the plurality of first table entries based on the length of each of the plurality of second table entries and a strip number where data needs to be modified;
    determining a first address of the target first table entry based on a length of each of the plurality of first table entries and an address of an initial first table entry;
    obtaining a second address of a target second table entry stored in the target first table entry based on the first address of the target first table entry; and
    writing information to be written into the target second table entry according to the second address.

5. The metadata management method according to claim 4, wherein the writing information to be written into the target second table entry according to the second address comprises:
    according to a controller to which the logical volume allocation unit belongs, assigning a tagged value for metadata of a stripe that belongs to the controller, and assigning an opposite tagged value for metadata of a stripe that does not belong to the controller; and
    writing a marked metadata into a power-off protection space.

6. The metadata management method according to claim 5, wherein the writing a marked metadata into a power-off protection space comprises:

compressing the marked metadata by executing compression algorithms through a plurality of controllers; and
allocating the power-off protection space to compressed metadata and writing the compressed metadata into the power-off protection space.

7. The metadata management method according to claim 6, wherein the compression algorithms of the metadata is based on a form of spatial equilibrium in response to a determination that the plurality of controllers are balanced.

8. The metadata management method according to claim 6, further comprising:
reading and returning data in a form of the compressed metadata in response to a determination that the data is read from the metadata.

9. The metadata management method according to claim 5, wherein the writing a marked metadata into a power-off protection space comprises:
in response to a determination that a preset controller is recovered after failure, copying database to a target controller, wherein the metadata is saved to a power protection memory space after being merged with metadata of the target controller, and data reading and writing are allowed to be continued after merging of the metadata has ended.

10. The metadata management method according to claim 1, wherein the managing metadata in the logical volume allocation unit by means of the two-level table comprises data deletion, and a data deletion step comprises:
determining a target first table entry corresponding to a strip number from the plurality of first table entries based on the length of each of the plurality of second table entries and a strip number where data needs to be modified;
determining a first address of the target first table entry based on a length of each of the plurality of first table entries and an address of an initial first table entry;
obtaining a second address of a target second table entry stored in the target first table entry based on the first address of the target first table entry; and
deleting information to be deleted into the target second table entry according to the second address of the target second table entry.

11. The metadata management method according to claim 10, wherein after the deleting information to be deleted into the target second table entry according to the second address of the target second table entry, the method further comprises:
updating the length of each of the plurality of second table entries and addresses recorded in each of the plurality of first table entries in the two-level table, according to the logical volume allocation unit after deleting the information.

12. The metadata management method according to claim 11, wherein after the deleting information to be deleted into the target second table entry according to the second address of the target second table entry, the method further comprises:
in response to non-existence of preset information in the plurality of second table entries, deleting the second-level table, and setting addresses recorded in a corresponding first-level table to be invalid.

13. The metadata management method according to claim 11, wherein the disk space forms a plurality of logical volume allocation units, and each of the plurality of logical volume allocation units corresponds to one controller; and
in response to a determination that deleting the information causes an attributing controller of a corresponding strip to change from a first controller to a second controller, deleting information of a strip from metadata of the first controller, and inserting the information of the strip into metadata of the second controller.

14. The metadata management method according to claim 1, wherein the managing metadata in the logical volume allocation unit by means of the two-level table comprises data merging, and a data merging step comprises:
determining a target first table entry corresponding to a strip number from the plurality of first table entries based on the length of each of the plurality of second table entries and a strip number where data needs to be modified;
determining a first address of the target first table entry based on a length of each of the plurality of first table entries and an address of an initial first table entry;
obtaining a second address of a target second table entry stored in the target first table entry based on the first address of the target first table entry; and
recording information to be inserted into the target second table entry according to the second address.

15. The metadata management method according to claim 14, wherein after the recording information to be inserted into the target second table entry according to the second address, the method further comprises:
updating the length of each of the plurality of second table entries and the address recorded in each of the plurality of first table entries in the two-level table, according to the logical volume allocation unit after inserting the information.

16. The metadata management method according to claim 15, wherein after the recording information to be inserted into the target second table entry according to the second address, the method further comprises:
in response to a determination that space corresponding to the plurality of second table entries is insufficient, obtaining a storage space from other logical volume allocation units, adding a preset second table entry, and adding a corresponding first table entry for the preset second table entry.

17. The metadata management method according to claim 15, wherein the disk space forms a plurality of logical volume allocation units, and each of the plurality of logical volume allocation units corresponds to one controller; and
in response to a determination that inserting the information causes an attributing controller of a corresponding strip to change from a first controller to a second controller, deleting information of a strip from metadata of the first controller, and inserting the information of the strip into metadata of the second controller.

18. The metadata management method according to claim 1, further comprising:
configuring metadata used by a background task in advance in response to a determination that at least one of the plurality of RAIDs starts the background task.

19. A computer device, comprising:
a memory, configured to store computer-readable instructions; and
one or more processors, configured to execute the computer-readable instructions, and upon execution of the computer-readable instructions, are configured to perform operations comprising:
forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;

generating a two-level table according to the logical volume allocation unit, wherein the two-level table comprises a first-level table and a second-level table, the first-level table comprises a plurality of first table entries, the second-level table comprises a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

20. One or more non-volatile computer-readable storage media storing computer-readable instructions, wherein the computer-readable instructions, when executed by one or more processors, are configured to cause the one or more processors to perform operations comprising:

forming a disk space by using a plurality of redundant arrays of independent disks (RAIDs), dividing the disk space into a plurality of blocks, combining the plurality of blocks crossing a plurality of disks into one stripe, and forming a plurality of stripes into a logical volume allocation unit;

generating a two-level table according to the logical volume allocation unit, wherein the two-level table comprises a first-level table and a second-level table, the first-level table comprises a plurality of first table entries, the second-level table comprises a plurality of second table entries, both a number of the plurality of first table entries and a number of the plurality of second table entries are equal to a size of the disk space divided by the logical volume allocation unit, an association is set between the plurality of first table entries and the plurality of second table entries, an address recorded in each of the plurality of first table entries is an address of a corresponding second table entry of the plurality of second table entries, a length of each of the plurality of second table entries in the second-level table based on a ratio of the logical volume allocation unit to a length of a single strip, and bitmaps of a set of stripes are recorded in each of the plurality of second table entries; and managing metadata in the logical volume allocation unit by means of the two-level table.

* * * * *